United States Patent [19]

Klausbruckner et al.

[11] 4,288,193

[45] Sep. 8, 1981

[54] ARRANGEMENT FOR FORMING AND HANDLING COLLECTIVE LOADS

[75] Inventors: Gert Klausbruckner; Konrad Sieber, both of Moosburg, Fed. Rep. of Germany

[73] Assignee: Steinbock GmbH, Moosburg, Fed. Rep. of Germany

[21] Appl. No.: 119,117

[22] Filed: Feb. 6, 1980

[30] Foreign Application Priority Data

Feb. 20, 1979 [DE] Fed. Rep. of Germany ....... 2906457

[51] Int. Cl.³ .............................................. B64D 7/00
[52] U.S. Cl. .................................. 414/342; 89/1.5 R; 198/418; 244/137 R; 414/63; 414/102; 414/589; 414/745
[58] Field of Search ..................... 414/30, 58, 63, 102, 414/110, 342, 589, 745, 748; 198/418; 244/137 R; 89/1.5 R, 1.5 C

[56] References Cited

U.S. PATENT DOCUMENTS

| | | | |
|---|---|---|---|
| 2,613,822 | 10/1952 | Stanley | 244/137 R X |
| 2,685,423 | 8/1954 | Meddowcroft et al. | 244/137 R |
| 2,734,705 | 2/1956 | Robertson | 89/1.5 R X |
| 2,785,807 | 3/1957 | Prowinsky | 414/589 |

*Primary Examiner*—Leslie J. Paperner

*Attorney, Agent, or Firm*—Toren, McGeady and Stanger

[57] ABSTRACT

An arrangement for assembling and conveying a number of elongated cylindrical loads such as aerial bombs, the loads being collectively supported in a carrier, includes an elongated single load supply track for delivering single ones of the loads to a collecting location. A positioning device at the collecting location arranges three of the loads from the supply track in a triangular configuration so that the axes of the single loads extend parallel to one another. The positioning device includes first and second load stands each arranged to support a different one of the single loads at the same level as the single loads on the supply track. A third load stand between the first and second load stands supports a third single load, and a mechanism associated with the third load stand lowers the third load from the level of the supply track to a certain level below that of the loads supported on the first and second stands. The collecting carrier is attached to the single loads by a handling device while the loads are positioned in the positioning device to form a collective load. A hoist arrangement removes the collective load from the positioning device, and a conveying arrangement conveys the collective load to a receiving location after the collective load is released from the hoist arrangement.

45 Claims, 7 Drawing Figures

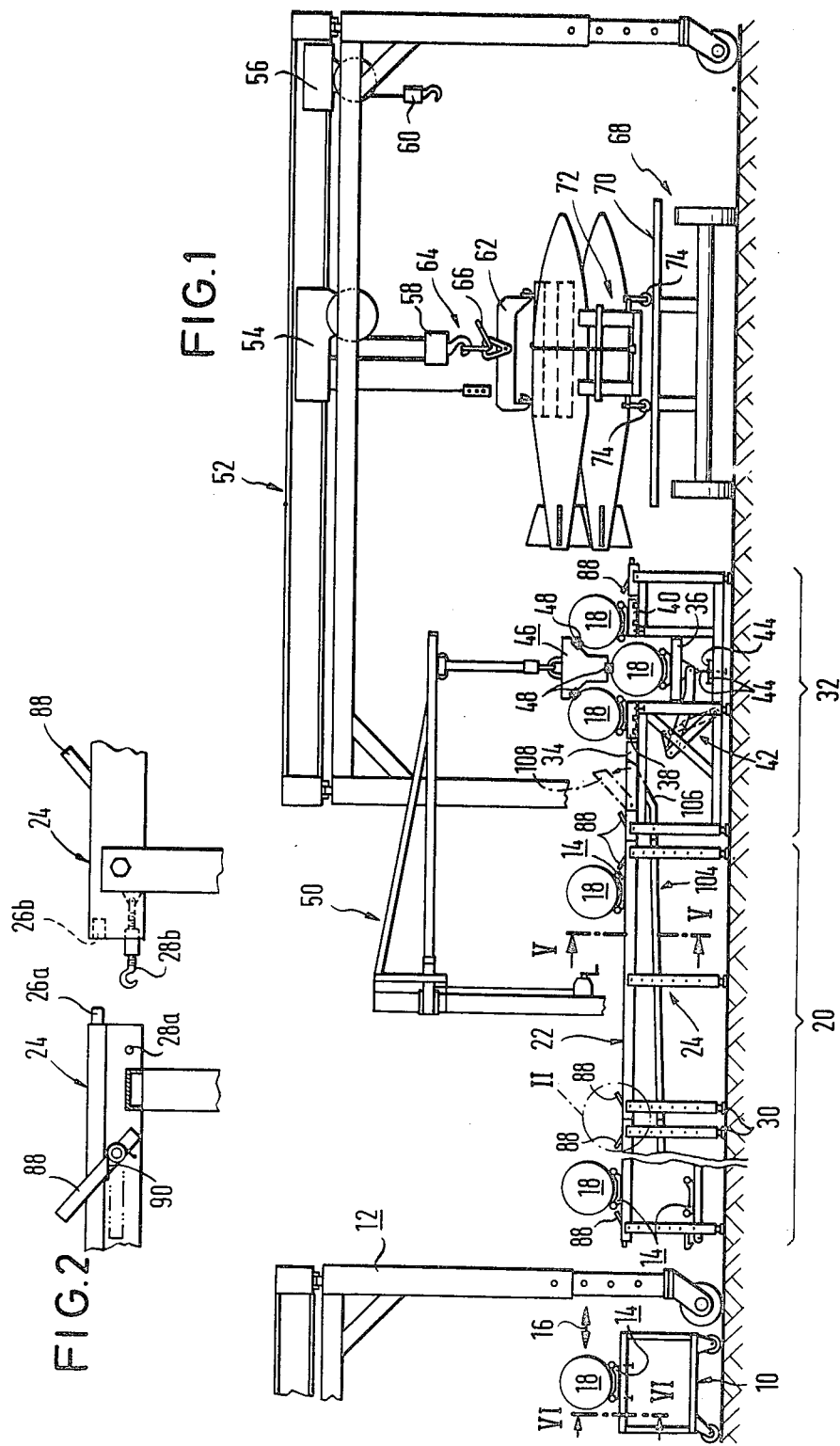

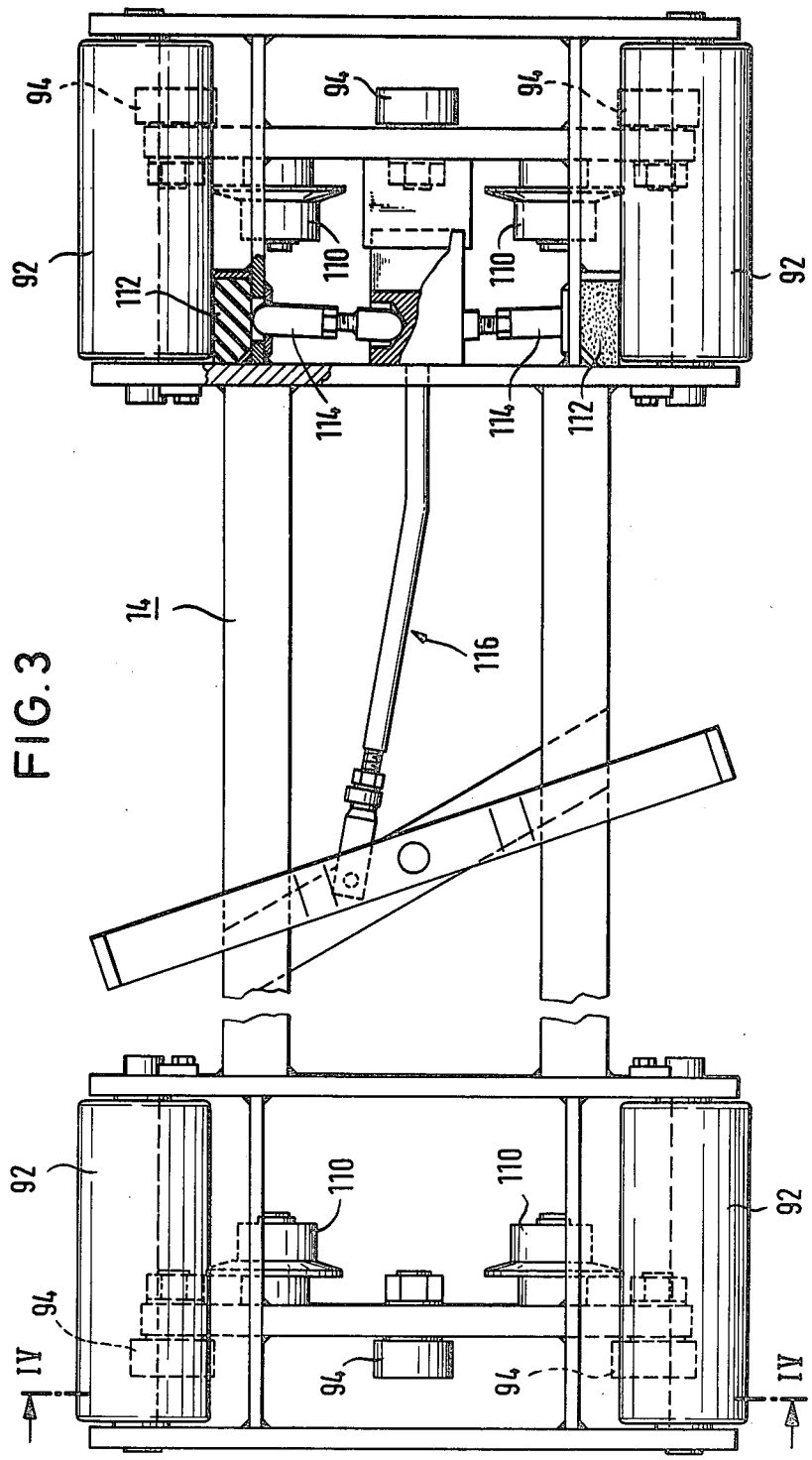

ARRANGEMENT FOR FORMING AND HANDLING COLLECTIVE LOADS

The invention relates to an arrangement for forming and handling collective loads which include a collecting carrier and particularly oblong cylindrical single loads which are coupled to the collecting carrier. The arrangement includes a single load supply track for supplying single loads in a supply position extending transversely of the longitudinal direction of the track, and a single load positioning device following the single load supply track. A collecting carrier handling device attaches the collecting carrier to the single loads positioned in the single load positioning device, and a hoisting apparatus for carrying the collective load from the single load positioning device to a conveying apparatus which conveys the collective load released from the hoisting apparatus to a collective load receiving location.

The invention is based on the task of constructing an arrangement of the above type in such a manner that the collective loads can be combined from the single loads as quickly as possible, and in a labor saving manner even in the case of a power failure. All the units of the arrangement should be of a very simple design and should be easy to operate, such that they can be assembled and operated even in emergency situations by operating personnel under stress. It should be possible to handle the parts as quickly as possible without requiring a complete disassembly. However disassembly should also be possible in order to facilitate space savings in transport and storage. Measures should be provided to accommodate handling even of sensitive loads, as much as possible, without bumping.

For solving this task, in accordance with the invention, three-unit collective loads are formed in a triangular arrangement. The single load positioning device is provided with a single load stand each on the level of the single load suppy track and, between these two single load stands, with a lowering device for lowering another single load.

In accordance with the construction according to the invention, for the formation of a triple load, only one load must be lowered relative to the level of the supply track. This can be done manually and easily, even in the case of a power failure.

Preferably, the arrangement serves for the secure guidance of the single loads.

The arrangement can be easily adjusted to loads of different sizes; maintain operation even in the case of power failure; ensure the highest operating speed even in difficult situations; and ensure that the loads can be slowly raised and lowered, but that the unloaded carriages can be raised and lowered quickly.

For ease of operation, the single loads must be adjusted relative to the collecting carrier to a certain position transversely of the supply track, so that the coupling members of the collecting carrier and the single loads can be brought into engagement. This requirement is fulfilled in the simplest possible manner and, particularly, the collecting carrier need not be moved successively into receiving positions opposite the single loads. This feature is already helpful when only a portion of the single load is adjustable transversely of the track, for example, when the collecting carrier must be adjusted toward the first of the single loads to be received and, subsequently, the remaining single loads can be moved relative to the collecting area.

According to further features of the invention, the loads can be easily moved into the single load positioning device and the horizontal axial distance of the two loads on the side from the center load can be adjusted, after the center load has been lowered.

The arrangement according to the invention should be suitable for continuous operation in the sense that the single load can be kept in a stand-by position for the single load positioning device on the supply track which, so to speak, acts as buffer storage. For this reason, it is frequently desirable that the carriages do not return on the supply track, and therefore, the invention provides this feature as well.

The construction of the carriages with two groups of rollers has been found advantageous, because the supply rollers which, in view of the heavy loads, must be carefully supported, do not run easily. This careful support would slow down the carriages too much during the return.

Further measure according to the invention avoid an unintentional collision of successive loads in the supply track so that the best ease of operation under various working situations can be achieved.

Other measures can be implemented in order to be able to work on the single loads on the carriages, for example, assembling the loads, and to facilitate the connection of the single loads to the collecting carrier, and to fix the single loads on the roller support in the desired position, particularly also in the case of an eccentric load distribution.

Still other measures according to the invention enhance the transporting capability of the entire arrangement, and facilitate additionally its transport and storage within a very small space.

To permit a quick flow of the units, the handling device for the collecting carrier advantageously is independent from the other conveying device, and is only provided for the purpose of receiving the collecting carriers. Therefore, this device can be easily constructed. For taking the collective loads from the single load positioning device, a travelling crane may be provided. This travelling crane can be operated even in the case of power failure, and can readily transport the collective loads over large distances to a collective load receiving location.

Additional measures according to the invention allow for the special case that the collective loads are to be mounted on or in an aircraft.

An assembly device can be arranged in front of the arrangement according to the invention. In this device, the single loads can be worked on, for example, assembled.

The flow of the units from the assembly device to the supply track can be accelerated, and the requirement for easy transporting capability also with respect to the assembly device can be met according to the invention.

The requirements with respect to transporting capability and disassembly capability also apply to the assembly crane.

With respect to an unimpeded flow of the units, it is desirable that separate, basically similar travelling cranes be provided in the assembly device and in the single load positioning device, and that the handling device for the collecting carrier also be separate.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view of portions of an arrangement according to the invention;

FIG. 2 shows, as a detail from the region II of FIG. 1, the connection between successive modular units of the single load supply track;

FIG. 3 shows a brake for the roller support of the carriages;

DETAILED DESCRIPTION OF THE INVENTION

Figure 4:
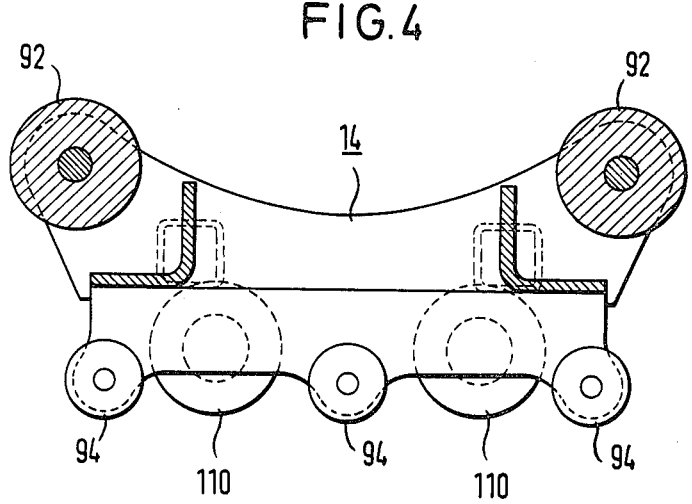
FIG. 4 is a partially sectional view of the carriages along the line IV—IV of FIG. 3.

FIG. 1 shows an assembly device 10. A travelling crane 12 is assigned to this assembly device 10. This travelling crane 12 makes it possible to lift partial loads onto a carriage 14. The carriage 14 is capable of travelling on the assembly device 10 in the direction of double arrow 16. Details concerning the carriage 14 shall be discussed later. The round single loads 18 are assembled from the partial loads on the carriage 14. A conveying table 20, for clarity's sake not shown in FIG. 2, follows the assembly device. On this conveying table, a single load supply track is arranged on which the carriages 14 can also travel. The conveying table 20 is composed of a plurality of modular units 24 which, as shown in FIG. 2, can be aligned relative to one another by means of tenon connections 26a, 26b and can be coupled to one another by means of gripping elements 28a, 28b. The modular units 24 are composed of releasably connected individual parts and their legs are provided with vertical adjustment means 30.

The conveying table 20 is followed by a single load positioning device 32. On this single load positioning device 32, a track 34 is formed on which the carriages 14 can also travel. In accordance with FIG. 2, the single load positioning device 32 is connected to the adjacent modular unit 24 of the conveying table 20. In the single load positioning device 32, the track 34 has a center load section 36 and two side load sections 38,40. The carriages 14 can travel in the longitudinal direction of the track also on these sections 36,38,40 of the track.

As illustrated in FIG. 1, the center load section 36 is vertically adjustable by means of a hydraulic-mechanical device 42, wherein the lowermost position can be adjusted by means of stops 44 of a turret. The hydraulic-mechanical device 42 can be operated from operating positions on both sides of the single load positioning device and comprises a motor drive and a manual drive. The manual drive is provided with a high-speed drive for the no-load operation and with a slow-speed drive for the loaded operation.

The side load and center load sections 36, 38, 40 of the track 34 are slidable perpendicularly to the plane of the drawing and can be fixed in alignment with the remaining track.

The arrangement described thus far operates as follows. The single loads 18 are assembled in the assembly device 10 while lying on the carriages 14. The single loads 18 are rotatably supported on the carriages 14, however, they can be fixed on the carriages 14. This shall be discussed later. With the assembled single loads 18, the carriages 14 are moved onto the single load supply track 22. From the single load supply track 22, the carriages 14 reach the single load positioning device 32. At this time, the center load section 36 of the track 34 is on the level of the single load supply track 22. Three carriages 14 are positioned on the two side load sections 38,40 and the center load section of the track 34. Subsequently, as illustrated in FIG. 1, the center load section 36 is lowered until reaching the stop with the stop member 44 which is effective at the time. Subsequently, the carriages 14 positioned on the two side load sections 38,40 can be moved toward each other in the horizontal direction, so that the triangular arrangement of the single loads is created which is shown in FIG. 1. A collecting carrier 46 is then moved into the position according to FIG. 1. The collecting carrier 46 is provided with coupling means 48 for coupling the single loads 18. The single loads 18 are provided with corresponding counter couplings.

The collecting carrier 46 is moved into position by means of a collecting carrier handling device 50, constructed as a revolving crane.

After the collecting carrier 46 has been moved into position, the center load section and the side load sections 36,38,40 are released, so that they are slidable perpendicularly of the drawing plane. The coupling means 48 can thereby be brought into the position of engagement with the counter coupling means of the single loads 18, so that the single loads 18 can be coupled to the collecting carrier 48. Of course, if the single loads 18 do not yet have the correct position of rotation on the carriage 14 for coupling to the collecting carrier 46, they must be rotated into position thus making the coupling possible.

The revolving crane 50 is then uncoupled from the collecting carrier 46 and is swung to the side.

A travelling crane 52 is assigned to the single load positioning device 32 for picking up the collective load formed of the collecting carrier 46 and the three single loads 18. The travelling crane 52 comprises two crabs 54 and 56. The crab 54 has a motor-driving hoisting unit 58; the crab 56 has a manually driven hoisting unit 60. The collective load is picked up by one of these hoisting units. For this purpose, the collecting carrier 46 is connected to a yoke 62 which is suspended from the hoisting unit 58 through a hook and eye connection 64. A second eye 66 has the purpose of making it possible to transfer, if necessary, the collecting carrier 46 suspended from the hoisting unit 58 to the hoisting unit 60 of the crab 56. A road-travelling collective load vehicle 68 can travel underneath the travelling crane 52, the vehicle 68 having a loading platform 70. A hoisting gear 72 is placed on the loading platform 70. The hoisting gear 72 has rollers 74 which facilitate travel on the loading platform 70. The collective load lowered onto the hoisting gear 72 is lashed to the hoisting gear 72.

Figure 7:
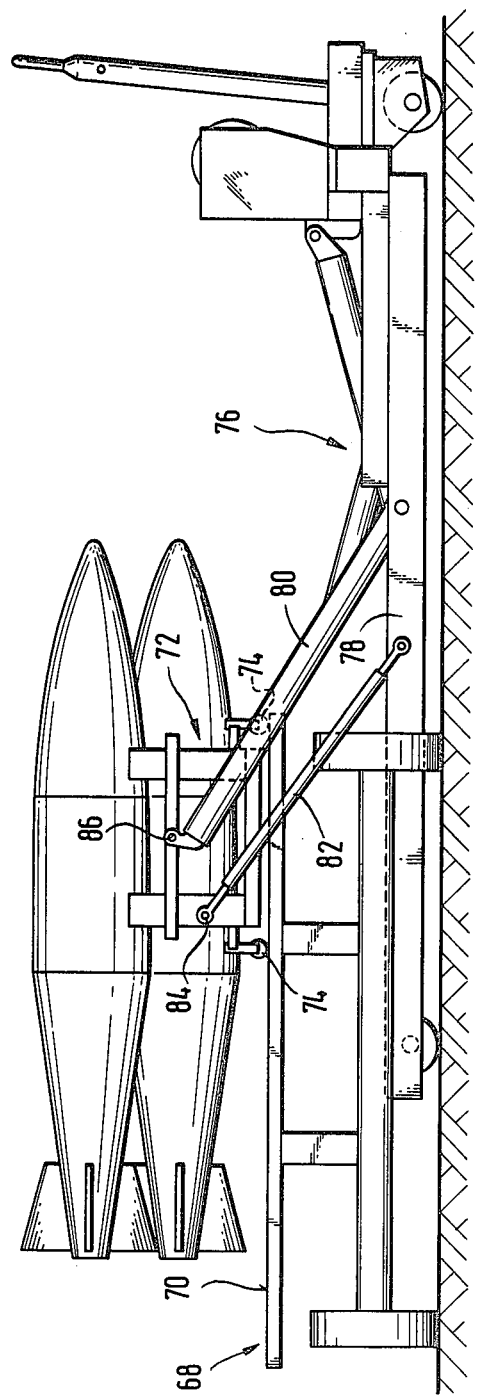
FIG. 7 shows the lifting device for the collective load.

The collective load, once lashed to the hoisting gear 72, is transported to, for example, an aircraft on the collective load vehicle 68. A lifting device 76, illustrated in FIG. 7, can be provided in the vicinity of the aircraft. The lifting device is adjusted into the load transfer position with the road-travelling collective load vehicle 68 by moving a portion of the undercarriage 78 of the lifting device 76 underneath the collective load vehicle 68. The fine positioning of the collective load relative to the lifting device 76 can be effected by moving the hoisting gear 72 on the loading platform 70 by means of the rollers 74. In the correct position of the hoisting gear 72 relative to the lifting device 76, two lifting arms 80, 82 of the lifting device 76 can be connected to the hoisting gear 72 through eyebolt connections 84, 86. The lifting arms 80, 82 form an articulated parallelogram which can be swung upwardly by means of power devices of the lifting device 76. By swinging this articulated parallelogram upwardly, the collective load can be moved into the receiving position for an aircraft, not shown, so that the collecting carrier 46 can be coupled to the aircraft, for example, under the wings. The lifting arm 82 is longitudinally adjustable, so that the inclination of the collective load relative to the horizontal can be varied. After coupling the collective load to the aircraft, the lashing between the collective load and the hoisting gear 72 is released, so that the hoisting gear with the lifting arms 80, 82 can again move downwardly and be prepared once again receiving a collective load on the collective load vehicle.

Concerning the conveying table 20 (FIG. 1), it should be added that locking pawls 88 are arranged at either end of each modular unit 24. These pawls 88 prevent the carriage 14 from travelling out of the respective modular unit, however, they can be passed when the carriages 14 travel into the respective modular unit. The locking pawls 88 are pretensioned in their normal positions of operation by means of springs 90. By means of pins, it is possible to keep the locking pawls 88 in the position according to FIG. 2 illustrated in dash-dot lines in which they are inoperative, or they can be locked against movement in such a way that they act as stops in either direction of travel of the carriages.

Figure 5:
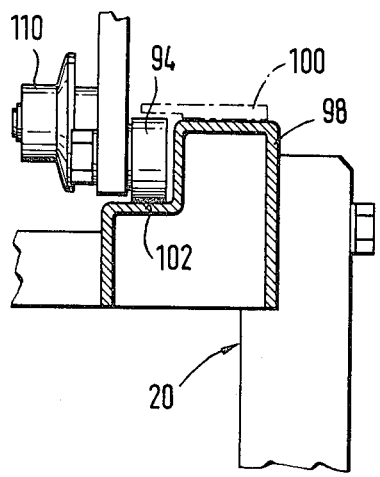
FIGS. 5 and 6 show, in sectional views along the lines V—V and VI—VI, respectively, of FIG. 1, the guidance of the carriages on the track sections of the single load supply track and the assembly device.
Figure 6:
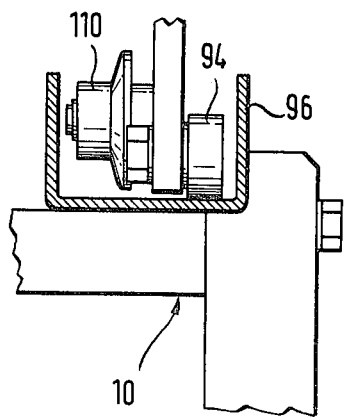

FIG. 4 shows two support rollers 92 on a carriage 14, the rollers facilitating a rotatable support of the single loads 18. The carriages have six supply rollers 94 which are supported in the carriage by bearings which are constructed in accordance with the load to be supported and, therefore, do not rotate easily. As illustrated in FIG. 6, in the region of the assembly device 10, the supply rollers 94 run in a channel section 96; in the region of the conveying table 20, the rollers 94 run in a stepped section 98 (FIG. 5) which, in view of the greater load prevailing in this region, has a greater bending resistance. The stepped section 98 is also used in the region of the single load positioning device 32. In the latter region, the stepped section is provided with a cover rail 100 which secures the carriages 14 in the side load sections 38 and 40 against falling down in the case that the supply roller 94 respectively facing the center load section 36 should lose contact with the running surface 102.

For returning the carriages 14 from the single load positioning device 32, a carriage return track 104 is arranged on the conveying table 20 as shown in FIG. 1. The carriage return track 104 is composed of individual track elements which belong to the individual modular units 24. The carriage return track 104 is connected to the single load supply track 22 through a switch 106. In the region of this switch 106, a section 108 of the single load supply track 22 can be folded upwardly, so that the carriages 14 can enter the carriage return track 104 through the switch 106 when the supply track section 108 is folded up.

As can be seen from FIG. 4, easily rotatable return rollers 110 are mounted on the carriages 14. The rollers 110 provide guidance for the carriages 14 on the carriage return track 104, so that the carriages 14, in spite of their relatively low weight, return on the slightly inclined carriage return track 104 through gravity.

The support rollers 92 of the carriages 14 can be frictionally loaded and blocked so as to fix the single loads 18 in a desired position of rotation about their longitudinal axes. FIG. 3 shows that brake pads 112 are assigned to the support rollers 92. These brake pads 112 are under the influence of brake bolts 114 which can be brought into an extended position from the position of FIG. 3 by means of a lever system 116 to effect a deceleration of the support rollers 92 in this manner.

As an example of the dimensions of the loads, it is noted that the single loads may weigh 250 to 450 kg, may have a diameter of 280 to 420 mm and a length of up to 3.4 m.

The modular units 24 may have a length of less than 2.35 m, so that they can be loaded onto motor trucks.

The travelling cranes 12 and 52 can be disassembled, so that they too can be transported on motor trucks.

By way of a base with ballast weight, the revolving crane 50 can be erected without fastening it to the ground. This revolving crane can also be provided with a hand-operated rope winch and a motor-driven rope winch. The hoisting units of the crane, if driven by a motor, are preferably driven by electric motors. The arrangement according to the invention is also capable of handling one or two individual loads at a time. The loads discussed herein can be, for example, aerial bombs.

While specific embodiments of the invention have been shown and described in detail to illustrate the application of the inventive principles, it will be understood that the invention may be embodied otherwise without departing from such principles.

I claim:

1. An arrangement for assembling and conveying a number of elongated generally cylindrical single loads which are collectively supported in a collecting carrier, comprising an elongated single load supply track for delivering the single loads to a collecting location so that each of the single loads extends transversely of the longitudinal direction of said supply track, a single load positioning device at said collecting location for arranging three of the single loads from said supply track in a triangular configuration so that the longitudinal axes of the single loads extend parallel to one another, said positioning device including a first and a second load stand each arranged to support a different one of the single loads at the same level as the single loads on said supply track, and a third single load stand between said first and said second single load stands for supporting a third single load, said third single load stand including means for lowering the third single load from the level of said supply track to a certain level below that of the single loads supported on said first and said second single load stands, a handling device for attaching the single loads positioned in said single load positioning device to the collecting carrier to form a collective load, a hoist arrangement for removing the collective load from said single load positioning device, and means for conveying the collective load to a collective load receiving location after the collective load is released from said hoist arrangement.

2. Arrangement according to claim 1, including a number of carriages for receiving the single loads, and means for guiding said carriages on said single load supply track from a loading location on said single load supply track to the collecting location.

3. Arrangement according to claim 2, wherein said single load positioning device comprises an arranging track adjoining said single load supply track at said collecting location, said arranging track includes a pair of side load sections and a center load section arranged between said pair of side load sections in the longitudinal direction of said single load supply track, said first and said second single load stands each comprises a different one of said pair of side load sections and said third single load stand comprises said center load section.

4. Arrangement according to claim 3, wherein said means for lowering the third single load operates to lower said center load section to an end position, and including means on said arranging track for varying said end position.

5. Arrangement according to claim 4, wherein said means for varying said end position includes a stop turret having a plurality of adjustable stops for determining the end position of said center load section.

6. Arrangement according to claim 3, including a hydraulic system for raising and lowering said center load section.

7. Arrangement according to claim 6, wherein said hydraulic system comprises a power-operated hydraulic pump and a hand-operated hydraulic pump.

8. Arrangement according to claim 6, including means for operating said hydraulic system from a number of operating positions in the vicinity of said single load positioning device.

9. Arrangement according to claim 7, wherein said hand-operated pump includes two stages and each said stage has a different volumetric displacement.

10. Arrangement according to claim 1, wherein said single load positioning device includes transverse positioning means for adjusting the positions of the single loads transversely of the longitudinal direction of said single load supply track.

11. Arrangement according to claim 10, wherein at least one of said carriages is arranged to be carried by said center load section and said pair of side load sections, and said at least one carriage includes means cooperative with said center load section and said pair of side load sections to form said transverse positioning means.

12. Arrangement according to claim 11, including means for fixing each of said center load section and said pair of side load sections in an aligned position relative to said single load supply track.

13. Arrangement according to claim 3, including means for adjusting said carriages on said side load sections in the longitudinal direction of said single load supply track after said center load section is lowered with respect to said side load sections.

14. Arrangement according to claim 2, including a carriage return track for returning said carriages to said single load supply track in the vicinity of the loading location.

15. Arrangement according to claim 14, wherein said carriage return track extends underneath said single load supply track.

16. Arrangement according to claim 14, including a switch arranged on one of said single load supply track and said arranging track for directing said carriages onto said carriage return track.

17. Arrangement according to claim 14, wherein each of said carriages includes a group of supply rollers supported by said carriages for enabling said carriages to transport the single loads to the collecting location, and a group of freely rotatable return rollers supported by said carriages for engaging said carriage return track to enable said carriages to be returned to said single load supply track.

18. Arrangement according to claim 3, including stop means successively arranged at certain intervals on one of said single load supply track and said arranging track in the longitudinal direction of said single load supply track for maintaining a number of the single loads on certain supply track sections separate from the single loads on adjacent supply track sections.

19. Arrangement according to claim 18, wherein said stop means includes a number of locking pawls arranged for relative movement on said certain supply track sections between a blocking position wherein said locking pawls prevent travel of the single loads out from said certain supply track sections, and a passing position wherein said locking pawls are retracted into said certain supply track sections to allow travel of the single loads to said adjacent supply track sections, and means for manually disengaging said locking pawls from the blocking position.

20. Arrangement according to claim 19, including means for fixing said locking pawls in said passing position so that single loads can travel past said locking pawls in both directions along the longitudinal axis of said single load supply track.

21. Arrangement according to claim 19, including means for fixing said locking pawls in a double-locking position wherein said locking pawls prevent passage of the single loads in both directions along the longitudinal axis of said single load supply track.

22. Arrangement according to claim 3, including means associated with said means for guiding said carriages for decelerating said carriages on said single load supply track and on said arranging track of said single load positioning device.

23. Arrangement according to claim 2, including a number of roller supports arranged on said carriages for supporting the single loads for rotation about the longitudinal axes of the single loads.

24. Arrangement according to claim 23, including means on said carriages for decelerating at least one of said roller supports.

25. Arrangement according to claim 1, wherein said single load supply track comprises a number of modular track units each forming a different one of a number of supply track sections, and means for fitting said modular track units to one another.

26. Arrangement according to claim 25, wherein said fitting means includes plug-in couplings on said modular track units for fitting said modular units together in alignment with one another.

27. Arrangement according to claim 25, wherein said modular track units are arranged to be transportable on motor trucks.

28. Arrangement according to claim 25, wherein said modular track units are arranged to be dimensionally adjustable.

29. Arrangement according to claim 25, wherein said single load positioning device has dimensions corresponding to those of each of said modular track units, and including plug-in couplings for connecting said single load positioning device adjacent to one of said modular track units.

30. Arrangement according to claim 1, wherein said handling device comprises a revolvable crane arranged to carry the collecting carrier before the single loads are attached to the collecting carrier.

31. Arrangement according to claim 1, wherein said hoist arrangement comprises a first travelling crane including a crab arranged to travel above said single load positioning device, and lift means engageable with the collecting carrier for raising the collecting carrier from said single load positioning device.

32. Arrangement according to claim 31, wherein said first travelling crane comprises a motor-driven hoisting unit and a hand-operated hoisting unit.

33. Arrangement according to claim 32, wherein said first travelling crane includes a second crab and said motor-driven hoisting unit and said hand-operated hoisting unit are each arranged on a different one of said crabs.

34. Arrangement according to claim 31, wherein said first travelling crane extends over a roadway, and including a collective load vehicle arranged to travel on the roadway for receiving the collective load.

35. Arrangement according to claim 1, including a movable hoisting gear arranged to be connected to the collective load.

36. Arrangement according to claim 35, including a loading platform on said collective load vehicle, and said hoisting gear is arranged to travel on said loading platform.

37. Arrangement according to claim 36, wherein said conveying means comprises a lifting device for raising the collective load and for transferring the collective load to a receiving location on an aircraft.

38. Arrangement according to claim 37, wherein said lifting device is constructed and arranged to raise said hoisting gear from said loading platform of said collective load vehicle.

39. Arrangement according to claim 38, wherein said lifting device is constructed and arranged so that the collective load together with said hoisting gear can be raised by said lifting device to be retained by a collective load receiving mechanism on the underside of an aircraft, and that said hoisting gear remains engaged with said lifting device after the collective load is retained by the collective load receiving mechanism.

40. Arrangement according to claim 25, including an assembly device in the vicinity of said single load supply track for supporting parts of the single loads.

41. Arrangement according to claim 40, wherein said assembly device is arranged so that said carriages can travel on said assembly device.

42. Arrangement according to claim 40, wherein said assembly device forms a modular assembly unit which corresponds to each of said modular track units forming said single load supply track, and said modular assembly unit is arranged to be coupled to one of said modular track units at one end of said single load supply track.

43. Arrangement according to claim 40, including a second travelling crane associated with said assembly device for placing the parts of the single loads onto said assembly device.

44. Arrangement according to claim 43, wherein said travelling crane is constructed and arranged to be dismountable.

45. Arrangement according to claim 43, wherein the construction of said second travelling crane substantially corresponds to that of said first travelling crane associated with said single load positioning device.

* * * * *